(12) United States Patent
Hart (10) Patent No.: US 8,219,620 B2
(45) Date of Patent: *Jul. 10, 2012

(54) UNWANTED E-MAIL FILTERING SYSTEM INCLUDING VOTING FEEDBACK

(75) Inventor: Matthew Thomas Hart, High Wycombe (GB)

(73) Assignee: McAfee, Inc., Santa Clara, CA (US)

( * ) Notice: Subject to any disclaimer, the term of this patent is extended or adjusted under 35 U.S.C. 154(b) by 3596 days.

This patent is subject to a terminal disclaimer.

(21) Appl. No.: 09/785,240

(22) Filed: Feb. 20, 2001

(65) Prior Publication Data

US 2002/0116463 A1 Aug. 22, 2002

(51) Int. Cl.
G06F 15/16 (2006.01)
(52) U.S. Cl. ......... 709/206; 709/204; 709/205; 709/207
(58) Field of Classification Search .................. 709/206, 709/207, 229, 223; 713/200
See application file for complete search history.

(56) References Cited

U.S. PATENT DOCUMENTS

| | | | |
|---|---|---|---|
| 5,121,345 A | | 6/1992 | Lentz |
| 5,283,856 A | * | 2/1994 | Gross et al. ..................... 706/47 |
| 5,509,120 A | | 4/1996 | Merkin et al. |
| 5,619,648 A | | 4/1997 | Canale et al. |
| 5,623,600 A | | 4/1997 | Ji et al. |
| 5,765,028 A | | 6/1998 | Gladden |
| 5,805,911 A | | 9/1998 | Miller |
| 5,832,208 A | | 11/1998 | Chen |
| 5,845,285 A | | 12/1998 | Klein |
| 5,870,549 A | | 2/1999 | Bobo, II |
| 5,999,932 A | * | 12/1999 | Paul ................................ 707/10 |
| 6,023,723 A | | 2/2000 | McCormick et al. |
| 6,047,277 A | | 4/2000 | Parry et al. |
| 6,052,709 A | | 4/2000 | Paul |
| 6,092,101 A | * | 7/2000 | Birrell et al. .................. 709/206 |
| 6,101,531 A | | 8/2000 | Eggleston et al. |

(Continued)

FOREIGN PATENT DOCUMENTS

EP 0813162 12/1997

(Continued)

OTHER PUBLICATIONS

Viega, J. et al.,"Mailman: the GNU mailing list manager", Proceedings of the 12th Systems Admin. Conference (LISA XII), p. 309-316, Dec. 1998.*

(Continued)

*Primary Examiner* — Krista Zele
*Assistant Examiner* — Azizul Choudhury
(74) *Attorney, Agent, or Firm* — Patent Capital Group (57) ABSTRACT

A filter mechanism for unwanted e-mail messages uses a downloadable central source (1, 2) of filter rule data. User reports of received unwanted e-mail messages are relayed back to the central source of the filter data and used to automatically update that filter data. An algorithmic approach to identifying characteristics of unwanted e-mail messages may be applied based upon the preponderance of predetermined words within an e-mail message or characteristics of the addressee list. If an e-mail message is identified as suspect, but not definitely unwanted, then it may be encapsulated within a HTML document and sent to its addressee together with buttons (28) allowing the recipient to provide feedback in the form of votes as to whether or not that email message is unwanted. This recipient feedback may be used to establish a new local rule.

16 Claims, 6 Drawing Sheets

U.S. PATENT DOCUMENTS

| | | | |
|---|---|---|---|
| 6,144,934 A | 11/2000 | Stockwell et al. | |
| 6,161,130 A * | 12/2000 | Horvitz et al. | 709/206 |
| 6,167,434 A | 12/2000 | Pang | |
| 6,189,002 B1 | 2/2001 | Roitblat | |
| 6,199,103 B1 * | 3/2001 | Sakaguchi et al. | 709/206 |
| 6,219,818 B1 | 4/2001 | Freivald | |
| 6,266,692 B1 * | 7/2001 | Greenstein | 709/206 |
| 6,321,267 B1 | 11/2001 | Donaldson | |
| 6,330,590 B1 | 12/2001 | Cotten | |
| 6,356,935 B1 | 3/2002 | Gibbs | |
| 6,393,423 B1 * | 5/2002 | Goedken | 707/10 |
| 6,393,464 B1 * | 5/2002 | Dieterman | 709/206 |
| 6,393,465 B2 * | 5/2002 | Leeds | 709/207 |
| 6,396,513 B1 * | 5/2002 | Helfman et al. | 345/752 |
| 6,421,709 B1 * | 7/2002 | McCormick et al. | 709/206 |
| 6,453,327 B1 | 9/2002 | Nielsen | |
| 6,546,390 B1 * | 4/2003 | Pollack et al. | 707/7 |
| 6,609,081 B1 | 8/2003 | de Varennes et al. | |
| 6,609,205 B1 | 8/2003 | Bernhard et al. | |
| 6,615,241 B1 * | 9/2003 | Miller et al. | 709/206 |
| 6,650,890 B1 | 11/2003 | Irlam et al. | |
| 6,654,787 B1 * | 11/2003 | Aronson et al. | 709/206 |
| 6,665,725 B1 | 12/2003 | Deitz et al. | |
| 6,675,162 B1 | 1/2004 | Russell-Falla et al. | |
| 6,684,394 B1 | 1/2004 | Shann | |
| 6,687,740 B1 | 2/2004 | Gough et al. | |
| 6,691,156 B1 | 2/2004 | Drummond et al. | |
| 6,718,367 B1 | 4/2004 | Ayyadurai | |
| 6,732,157 B1 | 5/2004 | Gordon et al. | |
| 6,748,422 B2 | 6/2004 | Morin et al. | |
| 6,757,830 B1 | 6/2004 | Tarbotton et al. | |
| 6,769,016 B2 | 7/2004 | Rothwell et al. | |
| 6,772,196 B1 | 8/2004 | Kirsch et al. | |
| 6,772,292 B2 | 8/2004 | Garber et al. | |
| 6,779,021 B1 * | 8/2004 | Bates et al. | 709/206 |
| 6,802,012 B1 | 10/2004 | Smithson et al. | |
| 6,868,498 B1 * | 3/2005 | Katsikas | 713/201 |
| 6,915,334 B1 | 7/2005 | Hall | |
| 7,007,080 B2 | 2/2006 | Wilson | |
| 7,016,939 B1 | 3/2006 | Rothwell et al. | |
| 7,047,297 B2 | 5/2006 | Huntington et al. | |
| 7,080,366 B2 | 7/2006 | Kramskoy et al. | |
| 7,103,645 B2 | 9/2006 | Leighton et al. | |
| 7,149,189 B2 | 12/2006 | Huntington et al. | |
| 7,162,698 B2 | 1/2007 | Huntington et al. | |
| 7,191,327 B2 | 3/2007 | Viljoen et al. | |
| 7,209,954 B1 | 4/2007 | Rothwell et al. | |
| 7,213,061 B1 | 5/2007 | Hite et al | |
| 7,213,062 B1 | 5/2007 | Raciborski et al. | |
| 7,213,260 B2 | 5/2007 | Judge | |
| 7,225,244 B2 | 5/2007 | Reynolds et al. | |
| 7,299,261 B1 | 11/2007 | Oliver et al. | |
| 7,386,889 B2 | 6/2008 | Shay | |
| 7,516,489 B2 | 4/2009 | Lahti | |
| 7,565,423 B1 | 7/2009 | Fredrickson | |
| 7,574,499 B1 | 8/2009 | Swildens et al. | |
| 7,580,982 B2 | 8/2009 | Owen et al. | |
| 7,590,684 B2 | 9/2009 | Herrmann | |
| 7,594,113 B1 | 9/2009 | Tan et al. | |
| 7,636,306 B2 | 12/2009 | Dougall et al. | |
| 7,647,376 B1 | 1/2010 | Jagger et al. | |
| 7,647,411 B1 | 1/2010 | Schiavone et al. | |
| 7,664,819 B2 | 2/2010 | Murphy et al. | |
| 7,689,822 B2 | 3/2010 | Maggenti et al. | |
| 7,716,367 B1 | 5/2010 | Leighton et al. | |
| 7,725,602 B2 | 5/2010 | Liu et al. | |
| 7,756,930 B2 | 7/2010 | Brahms et al. | |
| 7,774,843 B1 | 8/2010 | Prakash | |
| 7,797,443 B1 | 9/2010 | Pettigrew et al. | |
| 7,849,143 B2 | 12/2010 | Vuong et al. | |
| 7,873,695 B2 | 1/2011 | Clegg et al. | |
| 7,882,189 B2 | 2/2011 | Wilson et al. | |
| 7,891,001 B1 | 2/2011 | Greenawalt et al. | |
| 7,895,651 B2 | 2/2011 | Brennan | |
| 7,917,588 B2 | 3/2011 | Clegg et al. | |
| 7,917,961 B2 | 3/2011 | McIsaac et al. | |
| 7,926,104 B1 | 4/2011 | Sundaram et al. | |
| 7,970,832 B2 | 6/2011 | Perry et al. | |
| 7,984,493 B2 | 7/2011 | Jones | |
| 8,011,003 B2 | 8/2011 | Rowney et al. | |
| 8,032,594 B2 | 10/2011 | Helsper et al. | |
| 8,037,144 B2 | 10/2011 | Lund et al. | |
| 2002/0001307 A1 | 1/2002 | Nguyen et al. | |
| 2002/0016824 A1 | 2/2002 | Leeds | |
| 2002/0112227 A1 | 8/2002 | Kramskoy et al. | |
| 2002/0116463 A1 * | 8/2002 | Hart | 709/206 |
| 2002/0120705 A1 | 8/2002 | Schiavone et al. | |
| 2003/0087646 A1 | 5/2003 | Funato et al. | |
| 2003/0088627 A1 | 5/2003 | Rothwell et al. | |
| 2004/0177120 A1 | 9/2004 | Kirsch | |
| 2005/0015626 A1 | 1/2005 | Chasin | |
| 2005/0078088 A1 | 4/2005 | Davis et al. | |
| 2005/0097177 A1 | 5/2005 | McUmber et al. | |
| 2005/0177752 A1 | 8/2005 | Hollander | |
| 2006/0085543 A1 | 4/2006 | Hrastar et al. | |
| 2006/0101273 A1 | 5/2006 | Tan et al. | |
| 2006/0149823 A1 | 7/2006 | Owen et al. | |
| 2007/0067682 A1 | 3/2007 | Fang | |
| 2007/0079379 A1 | 4/2007 | Sprosts et al. | |
| 2007/0083929 A1 | 4/2007 | Sprosts et al. | |
| 2007/0220607 A1 | 9/2007 | Sprosts et al. | |
| 2008/0140847 A1 | 6/2008 | Almog | |
| 2009/0262741 A1 | 10/2009 | Jungck et al. | |

FOREIGN PATENT DOCUMENTS

| | | |
|---|---|---|
| GB | 2396993 | 7/2004 |
| WO | WO 98/37680 | 8/1998 |
| WO | WO 9933188 A2 * | 7/1999 |
| WO | WO 99/67731 | 12/1999 |
| WO | WO 03/010680 | 2/2003 |

OTHER PUBLICATIONS

Tim Bass, Lt. Col. Glenn Watt, "A Simple Framework for Filtering Queued SMTP Mail", 1997, IEEE, pp. 1140-1144.

Keith C. Ivey, "Spam: The Plague of Junk E-Mail", Apr. 1998, EEI Communications, pp. 15-16 (Cited in U.S. Appl. No. 09/916,599).

Harris Ducker, "Support Vector Machines for Spam Categorization", Sep. 1999, IEEE Transactions onNeural Networks, vol. 10, No. 5, pp. 1048-1054 (Cited in U.S. Appl. No. 09/916,599).

DNSBL, http://en.wikipedia.org/wiki/DNSBL.

Rekhter, Y. et al., "Address Allocation for Private Internets," RFC 1918, Feb. 1996.

Ferguson, P. et al., "Network Ingress Filtering: Defeating Denial of Service Attacks Which Employ IP Source Address Spoofing," RFC 2827, May 2000.

Callon, R. et al., "Guidelines for the Use of Internet IP-Addresses in the ISO Connectionless-Mode Network Protocol," RFC 1069, Feb. 1989.

Warnicke, E, "Suggested Scheme for DNS Resolution of Networks and Gateways," RFC 4183, Sep. 2005.

Gansterer, W. et al., "Anti-Spam Methods," State-of-the-Art, Mar. 2005, University of Vienna, Austria, pp. 1, 4-7, 19-21, 29-32.

Lynn, C. et al. "X.509 Extensions for IP Addresses and AS Identifiers," RFC 3779, Jun. 2004.

International Search Report in PCT International Application No. PCT/US02/23811 mailed on Oct. 29, 2002.

PCT Written Opinion in International Application Serial No. PCT/US02/23811 mailed on May 1, 2003.

International Preliminary Examination Report in PCT International Application No. PCT/US02/23811 completed on Jul. 9, 2003.

U.S. Appl. No. 09/916,599, filed Jul. 26, 2001.

Non-Final Office Action in U.S. Appl. No. 09/916,599 mailed on Oct. 7, 2004.

Response to Non-Final Office Action dated Oct. 7, 2001 in U.S. Appl. No. 09/916,599, filed Oct. 21, 2004.

Non-Final Office Action in U.S. Appl. No. 09/916,599 mailed on Feb. 23, 2005.

Response to Non-Final Office Action dated Feb. 23, 2005 in U.S. Appl. No. 09/916,599, filed Mar. 30, 2005.

Notice of Allowance in U.S. Appl. No. 09/916,599 mailed on Jun. 10, 2005.

Notice of Allowance in U.S. Appl. No. 09/916,599 mailed on Sep. 23, 2005.
Non-Final Office Action in U.S. Appl. No. 11/095,146 mailed on Jul. 18, 2006.
Response to Non-Final Office Action dated Jul. 18, 2006 in U.S. Appl. No. 11/095,146, filed Nov. 20, 2006.
Notice of Allowance in U.S. Appl. No. 11/095,146 mailed on Dec. 15, 2006.
U.S. Appl. No. 10/072,708, filed Feb. 5, 2002.
Non-Final Office Action in U.S. Appl. No. 10/072,708 mailed on Apr. 6, 2005.
Response to Non-Final Office Action dated Apr. 6, 2005 in U.S. Appl. No. 10/072,708, filed May 4, 2005.
Non-Final Office Action in U.S. Appl. No. 10/072,708 mailed on Jul. 25, 2008.
Response to Non-Final Office Action dated Jul. 25, 2008 in U.S. Appl. No. 10/072,708, filed Aug. 30, 2005.
Non-Final Office Action in U.S. Appl. No. 10/072,708 mailed on Nov. 18, 2005.
Response to Non-Final Office Action dated Nov. 18, 2005 in U.S. Appl. No. 10/072,708, filed Feb. 13, 2006.
Final Office Action in U.S. Appl. No. 10/072,708 mailed on May 3, 2006.
Pre-Brief Conference Request and Notice of Appeal in U.S. Appl. No. 10/072,708, filed Aug. 3, 2006.
Supplemental Appeal Brief in U.S. Appl. No. 10/072,708, filed Mar. 8, 2007.
Examiner's Answer to Appeal Brief in U.S. Appl. No. 10/072,708 mailed on Jul. 2, 2007.
Reply Brief in U.S. Appl. No. 10/072,708, filed Sep. 4, 2007.
BAPI Decision in U.S. Appl. No. 10/072,708 mailed on Feb. 26, 2009.
Request for Continued Examination and Amendment in U.S. Appl. No. 10/072,708 mailed on Apr. 27, 2009.
Non-Final Office Action in U.S. Appl. No. 10/072,708 mailed on May 28, 2009.
Response to Non-Final Office Action dated May 28, 2009 in U.S. Appl. No. 10/072,708, filed Aug. 28, 2009.
Notice of Allowance, Examiner Interview Summary, Notice of Allowability in U.S. Appl. No. 10/072,708 mailed on Nov. 2, 2009.
U.S. Appl. No. 11/281,966, filed Nov. 16, 2005.
Non-Final Office Action in U.S. Appl. No. 11/281,966 mailed on Sep. 18, 2009.
Response to Non-Final Office Action dated Sep. 18, 2009 in U.S. Appl. No. 11/281,966, filed Dec. 18, 2009.
Notice of Allowance in U.S. Appl. No. 11/281,966 mailed on Apr. 1, 2010.
Non-Final Office Action in U.S. Appl. No. 11/351,840 mailed on Jun. 11, 2009.
Response Non-Final Office Action dated Sep. 11, 2009 in U.S. Appl. No. 11/351,840, filed Sep. 11, 2009.
Final Office Action in U.S. Appl. No. 11/351,840 mailed on Jan. 6, 2010.
Response Final Office Action dated Jan. 6, 2010 in U.S. Appl. No. 11/351,840 filed Mar. 8, 2010.
Advisory Action in in U.S. Appl. No. 11/351,840 mailed on Mar. 25, 2010.
Request for Continued Examination and Amendment in U.S. Appl. No. 11/351,840, filed Apr. 6, 2010.
Non-Final Office Action in U.S. Appl. No. 11/351,840 mailed on Jun. 23, 2010.
Response Non-Final Office Action dated Jun. 23, 2010 in U.S. Appl. No. 11/351,840, filed Nov. 23, 2010.
Final Office Action in U.S. Appl. No. 11/351,840 mailed on Feb. 16, 2011.
Response Final Office Action dated Feb. 16, 2011 in U.S. Appl. No. 11/351,840, filed Apr. 18, 2011.
Examiner Interview Summary in U.S. Appl. No. 11/351,840 mailed on Apr. 28, 2011.
Advisory Action in in U.S. Appl. No. 11/351,840 mailed on May 5, 2011.
Request for Continued Examination and Amendment in U.S. Appl. No. 11/351,840, filed May 16, 2011.
Non-Final Office Action in U.S. Appl. No. 11/351,840 mailed on Jul. 22, 2011.
Response to Non-Final Office Action dated Jul. 22, 2011 in U.S. Appl. No. 11/351,840, filed Oct. 24, 2011.
U.S. Appl. No. 10/318,620, filed Dec. 13, 2002.
Iincluding all Office Actions and Responses in U.S. Appl. No. 10/318,620.
USPTO File History for U.S. Appl. No. 09/916,930 filed on Jul. 26, 2001.
Final Office Action in U.S. Appl. No. 11/351,840 mailed on Feb. 3, 2012.
Request for Continued Examination and Amendment in U.S. Appl. No. 11/351,840 filed on May 2, 2012.
U.S. Appl. No. 13/429,338 entitled "Unwanted E-Mail Filtering System Including Voting Feedback", filed on Mar. 24, 2012.
U.S. Appl. No. 13/429,345 entitled "Unwanted E-Mail Filtering System Including Voting Feedback", filed on Mar. 24, 2012.
U.S. Appl. No. 13/429,354 entitled "Unwanted E-Mail Filtering System Including Voting Feedback", filed on Mar. 24, 2012.

* cited by examiner

UNWANTED E-MAIL FILTERING SYSTEM INCLUDING VOTING FEEDBACK

BACKGROUND OF THE INVENTION

1. Field of the Invention

This invention relates to the field of data processing systems. More particularly, this invention relates to the field of e-mail filtering within such data processing systems.

With the rise in the use of e-mail as a communication mechanism, this has been accompanied by a rise in the occurrence of unsolicited and unwanted e-mail messages. These so-called "Spam" messages cause a number of problems, such as consuming physical network and processing resources as well as wasting the time of the recipients in dealing with these messages in their inbox.

2. Description of the Prior Art

It is known to provide e-mail filtering mechanisms that apply predefined rules to received e-mail messages in order that Spam messages may be identified and automatically deleted. These existing system often work on content filtering with rules based on regular expressions applied to all inbound messages. A significant amount of unwanted e-mail is generally still able to pass through such systems because the filtering rules are not normally maintained to a high degree and tend to lack flexibility to deal with an ever changing problem.

SUMMARY OF THE INVENTION

Viewed from one aspect the present invention provides a computer program product comprising a computer program operable to control a computer to process received e-mail messages, said computer program comprising:
  (i) filter downloading logic operable to download filter data from a remote source, said filter data specifying a plurality of tests that may be used to identify unwanted e-mail messages;
  (ii) e-mail filtering logic operable to receive an e-mail message and to apply said plurality of tests to identify unwanted e-mail messages; and
  (iii) unwanted message reporting logic operable to allow reporting to a filter data generator a new unwanted e-mail message received and not identified by said plurality of tests such that said filter data may be updated to identify said new unwanted e-mail message.

The invention recognises that unwanted e-mail messages are not generally restricted to a single user and that filtering rules developed in response to receipt of an unwanted e-mail message by one user may well be of use to another user who has yet to receive any of that unwanted e-mail. The invention also recognises that the value of allowing users to report the receipt of new unwanted e-mail messages not already trapped by the filters is that the positive identification of that mail as wanted by a user is very strongly indicative of the mail genuinely being a Spam mail that will be unwanted by all users. This contrasts with computer virus reporting or bug reporting by users where the updating of a central resource by a provider needs much more careful consideration before being performed as users may often be incorrect in their assessment of the nature of the problem. Compared to this, whether or not an e-mail is an unwanted e-mail is a decision that is primarily made in the mind of the recipient and so a report of such an e-mail message to a provider of filtered data is substantially definitive in establishing that the filter data should be modified to prevent receipt of that unwanted e-mail message. This lends the mechanisms well suited to being substantially automated thereby giving a possibility of faster filter generation and anti-Spam protection.

The tests applied by the filtering mechanisms of preferred embodiments use scoring algorithms to identify received e-mail messages as unwanted e-mail messages. The scoring algorithms are generally more flexible and have a chance of identifying new unwanted e-mail messages at their first occurrence due to content matching known criteria for unwanted e-mail messages, such as the presence of predetermined words in a high proportion or characteristics of the addressee list.

A particularly preferred feature of the invention is that should the tests identify an e-mail message as potentially unwanted then it is forwarded to its addressee together with a prompt that allows the addressee to provide feedback as to whether or not in their opinion the e-mail is an unwanted e-mail message. This preferred feature builds upon the realisation that the determination of whether or not an e-mail message is an unwanted e-mail message is primarily in the mind of the recipient and accordingly allowing the recipient to make this decision enables the load of maintaining the rules set to be distributed and a faster and more reliable response achieved.

A particularly preferred way of facilitating such feedback is to encapsulate the suspect e-mail message within a mark up language document that provides voting buttons to allow the addressee to give their feedback to the system.

Whilst the system could be arranged such that new rules could only be created centrally within the downloading source, preferred embodiments provide the ability for local rules t be created. This allows a faster response for an organisation receiving problems through unwanted e-mail messages and also allows a organisation to treat as unwanted e-mail messages that may not qualify as such in the view of the provider of the downloadable filter data.

In order to advantageously offload the burden of unwanted e-mail messages from the bulk of the mail systems of an organisation it is preferred that the filtering mechanisms are in place upstream of the primary mail server.

Viewed from another aspect the invention also provides a computer program product comprising a computer program operable to control a computer to process received e-mail messages, said computer program comprising:
  (i) e-mail filtering logic operable to receive an e-mail message and to apply at least one test to identify a received e-mail message as a potentially unwanted e-mail message; and
  (ii) message forwarding logic operable to forward said potentially unwanted e-mail message to its addressee together with a prompt for said addressee to provide feedback as to whether or not said received e-mail message is an unwanted email message.

The user feedback mechanism applied to suspect e-mail messages is potentially advantageous in its own right independently of the central downloadable source of filter data.

Viewed from a further aspect the invention also provides a computer program product comprising a computer program operable to control a computer to provide downloadable filter data for identifying unwanted e-mail messages, said computer program comprising:
  (i) user report receiving logic operable to receive a user report of an unwanted e-mail message received by said user of said downloadable filter data; and (ii) filter data updating logic operable in response to receipt of one or more of said user reports to modify said downloadable filter data to add a test to identify a new unwanted e-mail message.

It will be appreciated that the source of the downloadable filter data itself represents a complementary aspect of the present invention. The downloadable data source and the client system using that downloadable data may be physically separated by considerable distance and may be provided in different countries. Both the client and the data source are separate aspects of the same inventive concept.

Further aspects of the invention provide a method of processing received email messages and an apparatus for processing received e-mail messages.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
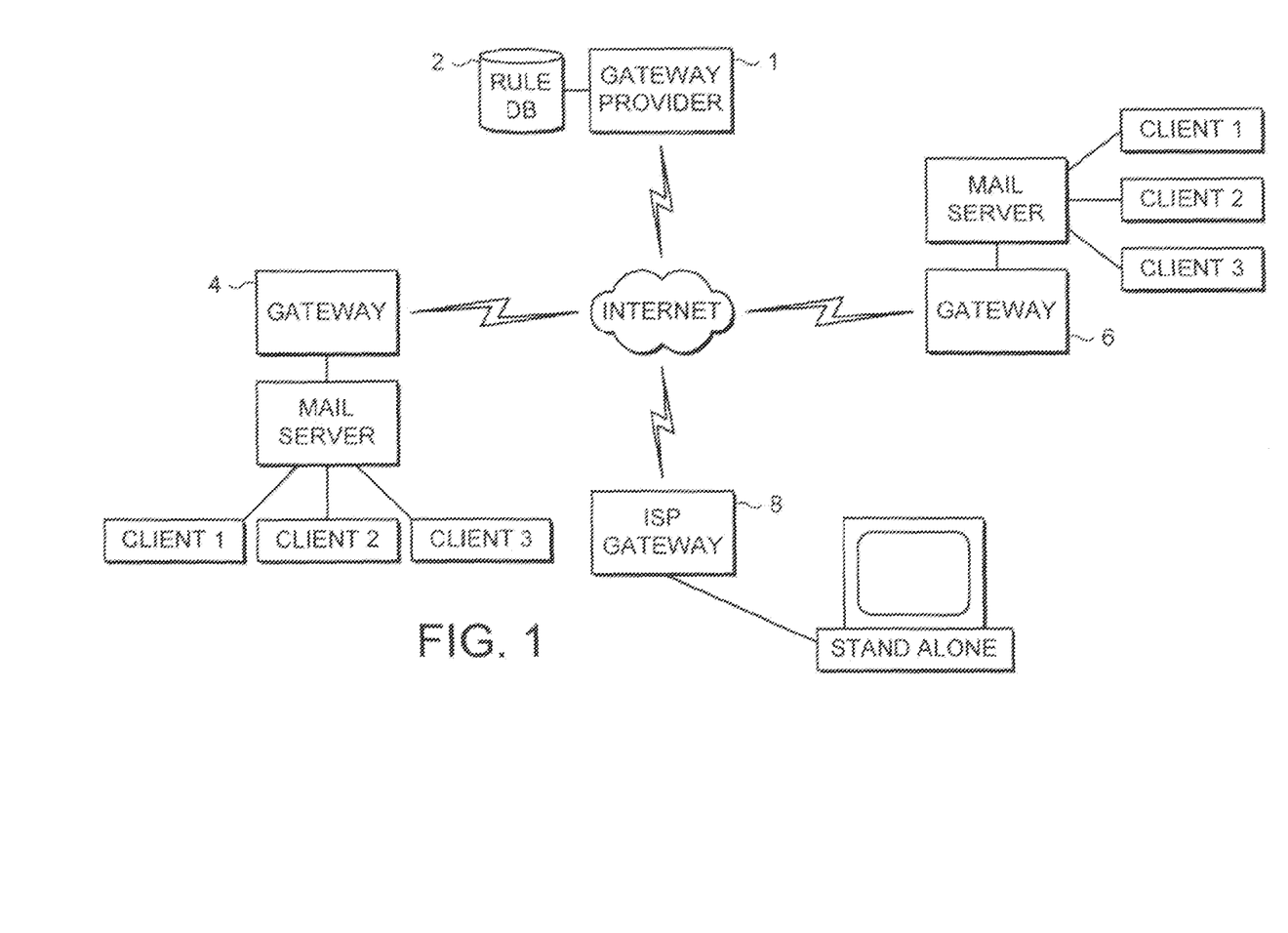
FIG. 1 schematically illustrates an arrangement of a filter data provider and filter data users.

FIG. 1 illustrates a plurality of e-mail users in the form of client computers connected via respective mail servers and gateways through the internet. A central provider 1 of the downloadable filter data uses an attached rule database 2 to generate filter data files that may be downloaded by individual connected gateway computers 4, 6, 8. These gateway computers apply the downloaded filter data specified tests to received e-mail messages prior to passing these along to their associated mail servers. The individual gateways 4, 6, 8 may also apply locally defined filtering rules specific to that particular organisation or user.

The rules specified in the rule database 2 may be of an algorithmic form rather than a less flexible direct regular expression form. A predetermined list of words identified as common within unwanted e-mail messages may be established. Words such as "buy", "free", "credit" and others have a relatively higher likelihood of occurrence within unwanted e-mail messages than in wanted e-mail messages. By being responsive both to the occurrence of such predetermined rules and the size of the e-mail message itself an indication of the likelihood of an e-mail message being an unwanted email message can be algorithmically determined. Individual words may be given a greater or lesser waiting in the degree to which they indicate that an e-mail message is an unwanted e-mail message. When an e-mail message has been processed by this "fuzzy logic" type testing mechanism, then an indication will be given as to whether or not the e-mail message is definitely unwanted, potentially unwanted or wanted. Wanted e-mail messages can be passed through to the addressee, definitely unwanted e-mail messages can be deleted and potentially unwanted e-mail messages can be subject to further processing as described below.

The rules may also be responsive to the addressee of a received e-mail message. If a particular e-mail message is detected as being addressed to users who do not exist as well as some that do exist, then this may be indicative of an unwanted e-mail message generated using lexicon based techniques. Depending upon the preponderance of invalid e-mail addresses compared to valid e-mail addresses, such a rule could be used to classify an e-mail message as either definitely unwanted, suspect or wanted.

Figure 2:
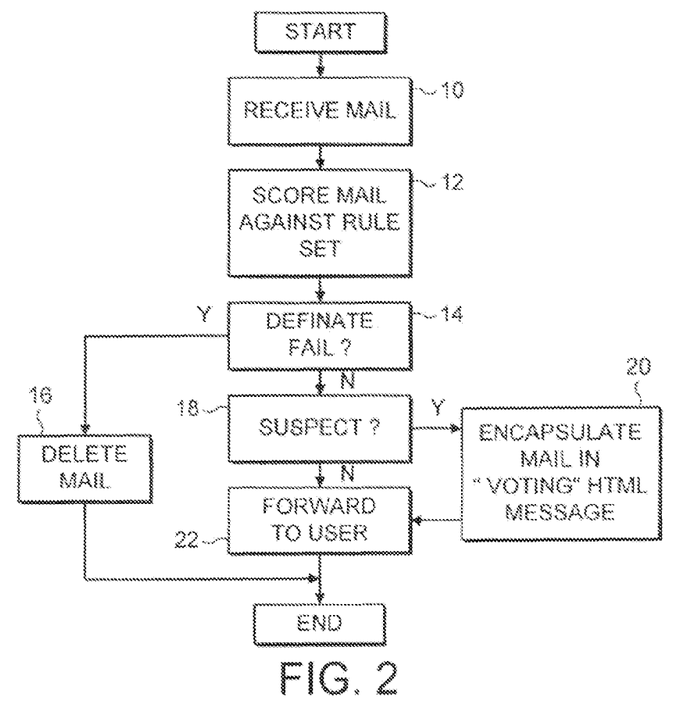
FIG. 2 is a flow diagram illustrating the operation of a client user of the filter data.

FIG. 2 is a flow diagram schematically illustrating the rule based processing that may be applied by the various gateway computers 4, 6, 8. At step 10, an e-mail message is received. At step 12 the e-mail message is compared with the downloaded and locally generated rule sets held by that gateway computer 4, 6, 8 and scored as to its likelihood of being an unwanted e-mail message.

At step 14, a determination is made from the score as to whether or not the e-mail message is definitely unwanted. If the e-mail message falls within this category, then it is deleted at step 16. If the e-mail message is not definitely unwanted, then it passes to step 18 where a test is made as to whether or not its score indicates that it is a potentially unwanted suspect e-mail message. If the e-mail message is a potentially unwanted E-mail message, then it is passed to step 20 where it is encapsulated within an HTML mail message with voting buttons added to the bottom of the mail message to enable a recipient to provide feedback to a central source as to whether or not that encapsulated mail message is in fact an unwanted mail message. Button is a term that indicates a mechanism within the message allowing automated feedback rather than a specific appearance or coding form.

If the e-mail message is definitely wanted or after encapsulation at step 20, then the message is forwarded to the addressee at step 22.

Figure 3:
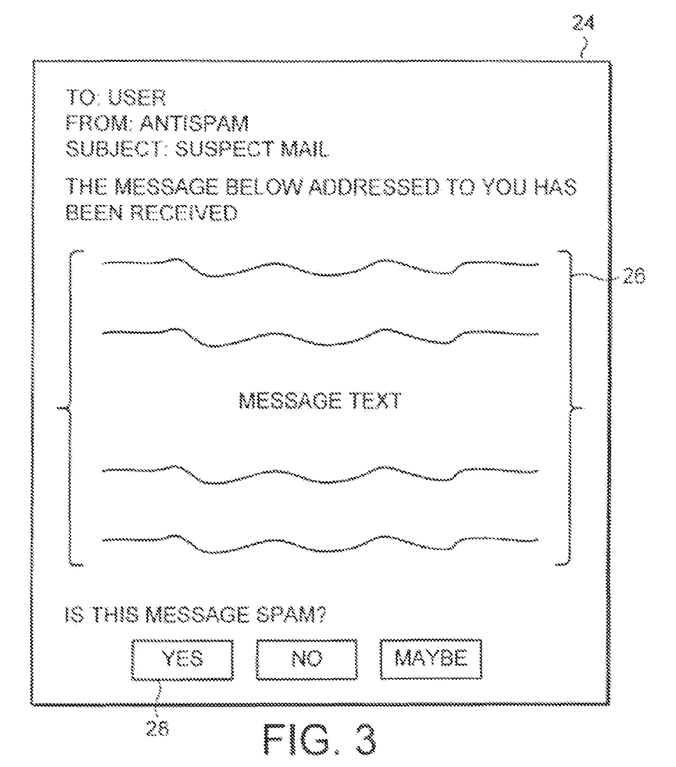
FIG. 3 schematically illustrates the encapsulation of a suspect e-mail message within a markup language document with voting buttons.

FIG. 3 schematically illustrates a markup language document 24 containing the encapsulated suspect e-mail message 26. The voting buttons 28 provided at the foot of the message 24 sent to the user allows the user to provide feedback to a central source effectively voting upon the nature of the encapsulated e-mail message 26. Within an individual gateway computer 4, 6, 8, a threshold of a predetermined number of votes positively identifying an e-mail as an unwanted e-mail may be set before triggering a report to the central filter data provider or the generation of a new local rule. The feedback mechanism illustrated is shown in the form of classic HTML buttons, but it will be appreciated that different user interface mechanisms may be provided in conjunction with the encapsulated message to allow a user to provide their feedback as to the nature of the encapsulated E-mail message 26.

Figure 4:
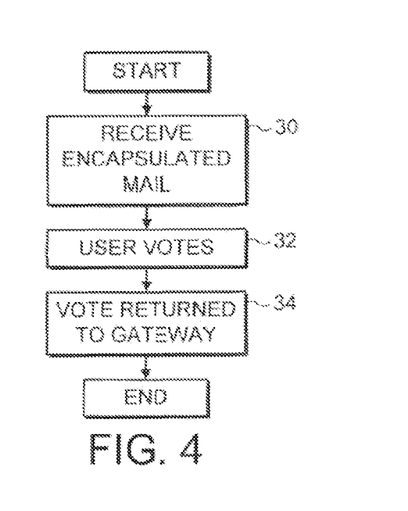
FIG. 4 is a flow diagram illustrating the processing by a user of the message of FIG. 3.

FIG. 4 is a flow diagram illustrating the processing performed by the recipient of a message such as illustrated in FIG. 3. At step 30 the user receives the message. At step 32 the user votes on the nature of the message by clicking on one of the buttons 28. At step 34 this vote is returned to the gateway computer 4, 6, 8 associated with that user.

Figure 5:
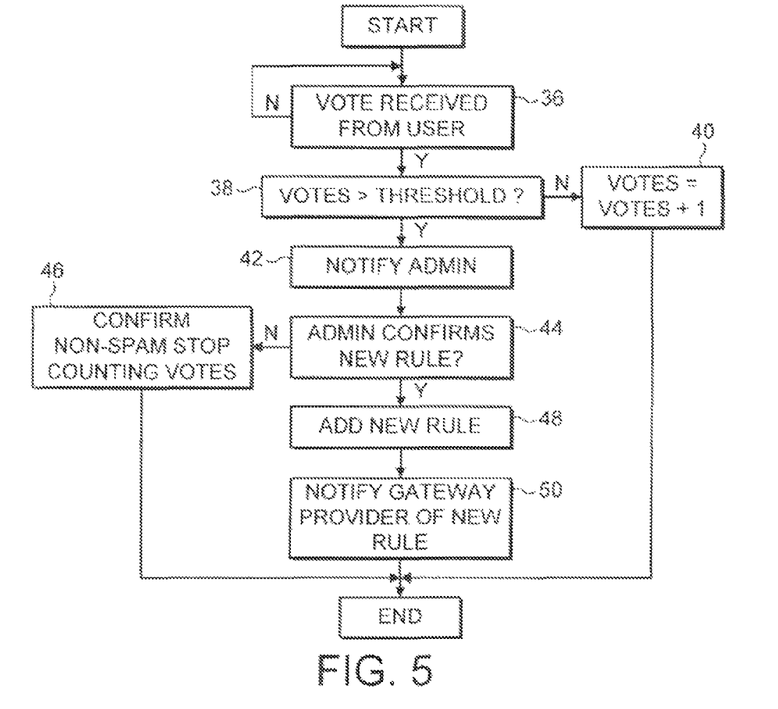
FIG. 5 is a flow diagram illustrating the response of a system to votes received from recipients of the message of FIG. 3.

FIG. 5 is a flow diagram illustrating how the gateway computer 4, 6, 8 may respond to votes upon suspect e-mail messages. At step 36 the system waits for votes to be received. When a vote is received, step 38 determines whether or not this newly received vote has the result of making the total number of votes received in relation to that particular encapsulated message 26 exceed a predetermined threshold level, such as three votes positively identifying the encapsulated message 26 as unwanted. If the threshold has not yet been exceeded, then step 40 serves to increment the current count and processing terminates. Processing to accommodate conflicting votes may also be provided.

If the threshold has now been exceeded, then step 42 issues a notification to an administrator of the gateway computer 4, 6, 8. The notification to the administrator generated at step 42 can give an indication of the unwanted e-mail message and allow the administrator to either confirm or not confirm the appropriateness of now treating that e-mail message as unwanted and generating an associated new rule. The administrator makes this confirmation at step 44.

If the administrator indicates that the message should not be treated as unwanted, then step 46 stops further counting of votes relating to that message. If the e-mail message is confirmed as unwanted, then step 48 automatically generates a new local rule to filter out that e-mail message and step 50 provides a notification of the nature of that e-mail message to the central downloadable filter data source such that other users may benefit from the experience of the current user.

It will be appreciated that the confirmation steps by the administrator could be removed and the process once the votes had exceeded the predetermined threshold level could be completely automated. This accords well with the realisation that the determination of whether or not an e-mail message is a Spam e-mail message is one properly decided by the recipients and intervention by an administrator may not be necessary or appropriate.

Figure 6:
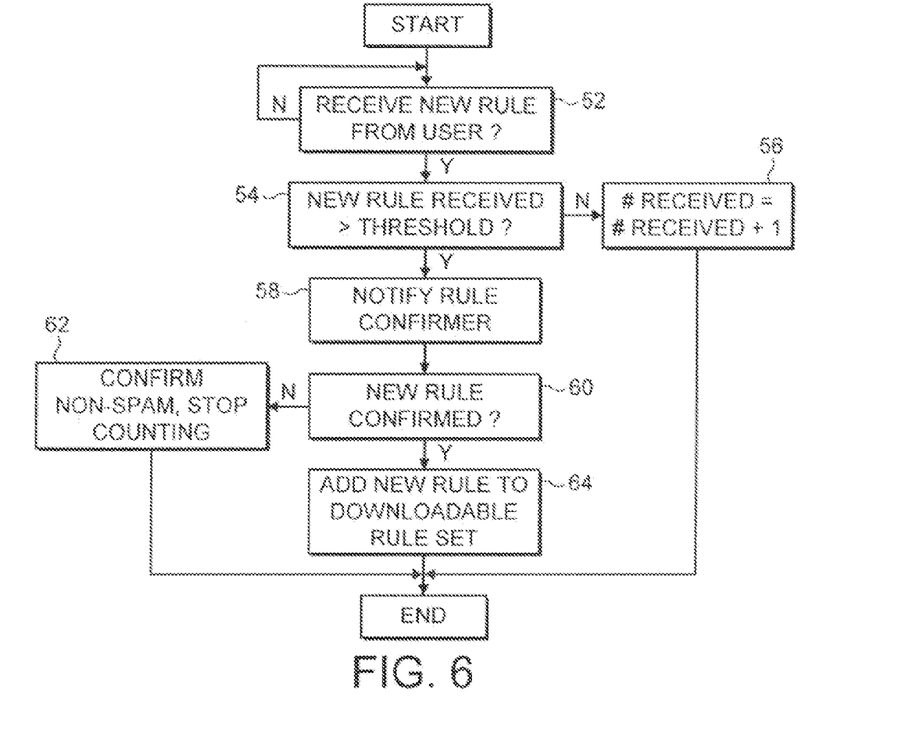
FIG. 6 is a flow diagram illustrating the processing applied by the downloadable filtered data provider on receipt of user reports of problem e-mails.

FIG. 6 is a flow diagram illustrating how the central source of downloadable filter data may respond to notifications from separate gateway computers 4, 6, 8 of newly detected unwanted e-mail messages. At step 52, the system waits for new notifications. At step 54, the system checks as to whether or not a newly received notification means that a threshold level of notifications relating to a particular e-mail message has now been received. If the threshold level has not yet been exceeded, then step 56 increments the current count and processing terminates.

If the threshold has been exceeded, then a central authority confirming new globally applicable rules is notified at step 58. Given that new rules set up within the downloadable filtered data will impact potentially all the users of the system, there is a high level of justification for at least having some level of manual checking of new global rules. It may be that the new rules are automatically added to the set and checked retrospectively in order to provide the optimum speed of response. It could be that the confirmation would not be required if severally highly trusted users reported an e-mail message as unwanted compared with perhaps individual users.

If confirmation is being sought, then this is received at step 60. If the new rule is not confirmed, then step 62 terminates further counting in relation to that e-mail message. If the new rule is confirmed, then step 64 automatically adds it to the downloadable rule set 2.

Figure 7:
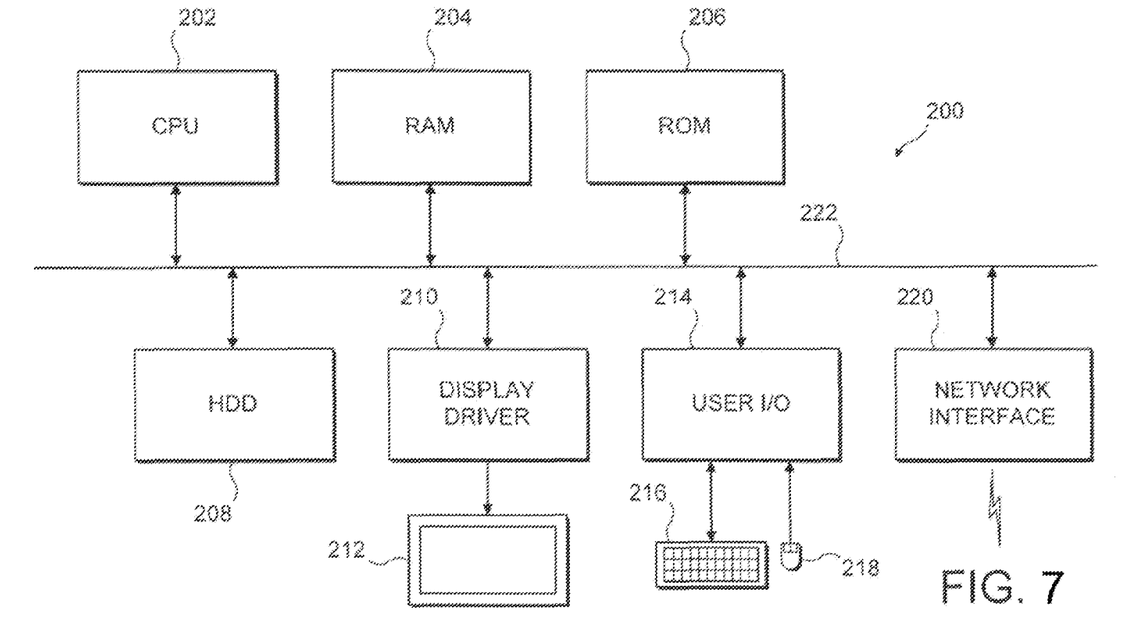
FIG. 7 is a schematic diagram showing a computer that may be used to implement the above described techniques.

FIG. 7 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 7 is merely one example of a type of computer that may execute the computer program product, method and provide the apparatus described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product comprising logic encoded in one or more non-transitory media that includes code for execution and when executed by one or more processors is operable for processing received e-mail messages for a plurality of addressees to: (i) receive an e-mail message and to apply at least one test to identify a received e-mail message as a potentially unwanted e-mail message; and (ii) forward said potentially unwanted e-mail message to its addressee together with a prompt for said addressee to provide feedback as to whether or not said received e-mail message is an unwanted e-mail message; wherein a rule associated with receiving said e-mail is added if a threshold of a predetermined number of votes, received as the provided feedback from said addressees, positively identifies said potentially unwanted e-mail message as an unwanted e-mail message; wherein a scoring algorithm responsive to identification of predetermined words within said received e-mail message and a message size of said received e-mail message is used to identify said received e-mail message as a potentially unwanted e-mail message.

2. A computer program product as claimed in claim 1, wherein said potentially unwanted e-mail message is forwarded encapsulated within a markup language document including a hypertext markup language document capable of being displayed utilizing a network browser, the document providing voting buttons to allow said addressee to provide said feedback.

3. A computer program product as claimed in claim 1, wherein said encoded logic is operable to add a new test to those applied to said received e-mail messages in dependence upon said feedback.

4. A computer program product as claimed in claim 1, wherein said scoring algorithm is responsive to an addressee list of said received e-mail message.

5. A computer program product as claimed in claim 1, further comprising test creating logic operable to allow creation of a new test to be added to said at least one test.

6. A computer program product as claimed in claim 1, wherein said e-mail message is received before said e-mail message reaches an associated target e-mail server.

7. A computer program product as claimed in claim 1, wherein said prompt for said addressee to provide feedback is not forwarded with said potentially unwanted e-mail if an administrator identifies said e-mail message as being wanted.

8. A computer program product as claimed in claim 1, wherein said rule associated with receiving said e-mail is confirmed manually.

9. A computer program product comprising logic encoded in one or more non-transitory media that includes code for execution and when executed by one or more processors is operable for processing received e-mail messages for a plurality of addressees to:
(i) receive an e-mail message and to apply at least one test to identify a received e-mail message as a potentially unwanted e-mail message; and
(ii) forward said potentially unwanted e-mail message to its addressee together with a prompt for said addressee to provide feedback as to whether or not said received e-mail message is an unwanted e-mail message;
wherein a rule associated with receiving said e-mail is added if a threshold of a predetermined number of votes, received as the provided feedback from said addressees, positively identifies said potentially unwanted e-mail message as an unwanted e-mail message;
wherein a scoring algorithm responsive to identification of predetermined words within said received e-mail message and a message size of said received e-mail message is used to identify said received e-mail message as a potentially unwanted e- mail message.

10. A computer program product as claimed in claim 8, wherein said prompt for said addressee to provide feedback is not forwarded with said potentially unwanted e-mail and said rule is not added if said rule is not confirmed manually.

11. A method of processing received e-mail messages for a plurality of addressees, said method comprising:
(i) receiving an e-mail message and to apply at least one test to identify a received e-mail message as a potentially unwanted e-mail message; and
(ii) forwarding said potentially unwanted e-mail message to its addressee together with a prompt for said addressee to provide feedback as to whether or not said received e-mail message is an unwanted e-mail message;
wherein a rule associated with e-mail filtering logic is added if a threshold of a predetermined number of votes, received as the provided feedback from said addressees, positively identifies said potentially unwanted e-mail message as an unwanted e-mail message;
wherein a scoring algorithm is utilized responsive to identification of predetermined words within said received e-mail message and a message size of said received e-mail message to identify said received e-mail message as a potentially unwanted e-mail message.

12. A method as claimed in claim 11, wherein said potentially unwanted e-mail message is forwarded encapsulated within a markup language document including a hypertext markup language document capable of being displayed utilizing a network browser, the document providing voting buttons to allow said addressee to provide said feedback.

13. A method as claimed in claim 11, further comprising adding a new test to those applied to said received e-mail messages in dependence upon said feedback.

14. Apparatus for processing received e-mail messages for a plurality of addressees, said apparatus comprising:
(i) an e-mail filter operable to receive an e-mail message and to apply at least one test to identify a received e-mail message as a potentially unwanted e-mail message; and
(ii) a message forwarder operable to forward said potentially unwanted e-mail message to its addressee together with a prompt for said addressee to provide feedback as to whether or not said received e-mail message is an unwanted e-mail message;
wherein a rule associated with e-mail filtering logic is added if a threshold of a predetermined number of votes, received as the provided feedback from said addressees, positively identifies said potentially unwanted e-mail message as an unwanted e-mail message;
wherein said e-mail filter uses a scoring algorithm responsive to identification of predetermined words within said received e-mail message and a message size of said received e-mail message to identify said received e-mail message as a potentially unwanted e-mail message.

15. Apparatus as claimed in claim 14, wherein said potentially unwanted e-mail message is forwarded encapsulated within a markup language document including a hypertext markup language document capable of being displayed utilizing a network browser, the document providing voting buttons to allow said addressee to provide said feedback.

16. Apparatus as claimed in claim 14, wherein said message filter is operable to add a new test to those applied to said received e-mail messages in dependence upon said feedback.

* * * * *